March 16, 1937. M. J. SHEFFIELD 2,073,884
CULTIVATOR ATTACHMENT
Filed July 16, 1936
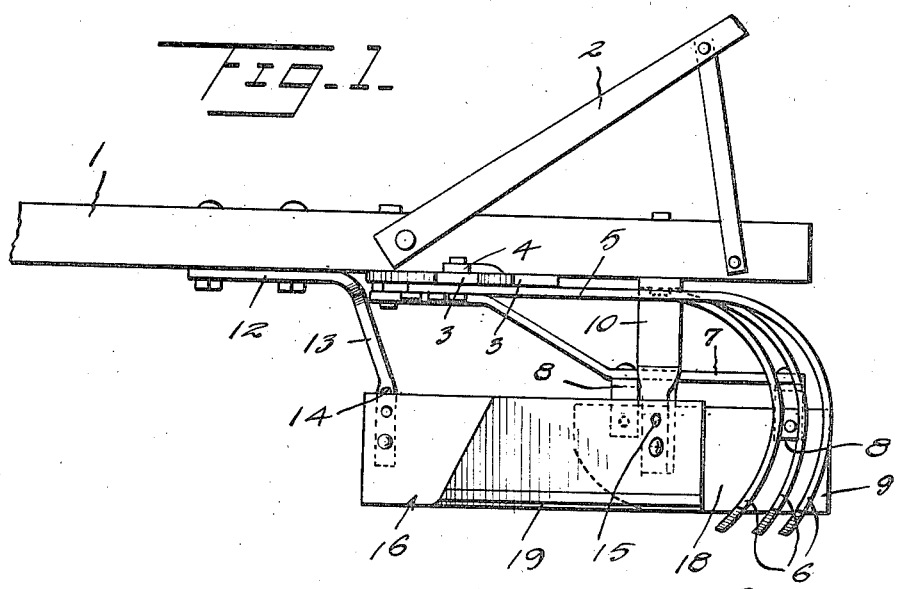
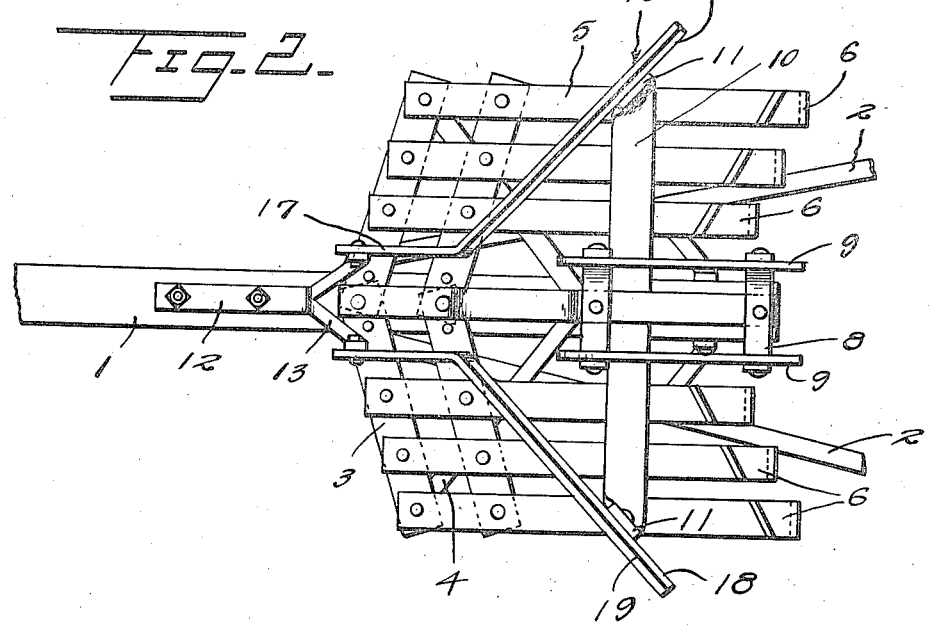
Inventor
M. J. Sheffield
By Watson E. Coleman
Attorney Patented Mar. 16, 1937

2,073,884

UNITED STATES PATENT OFFICE 2,073,884

CULTIVATOR ATTACHMENT

Marvin J. Sheffield, Carrollton, Ga.

Application July 16, 1936, Serial No. 90,974

1 Claim. (Cl. 97—170)

This invention relates to improvements in farming implements and pertains particularly to cultivators.

The present invention has for its primary object to provide an improved attachment for cultivators of the spring-tooth type particularly or for any other of the types which may be employed for cultivating rows of plants by means of which the earth at the sides of the plant row will be cleared of stones and other loose material so that the earth-working elements of the cultivator may operate efficiently to loosen the earth at the sides of the plants.

Another object of the invention is to provide an attachment of the above described character which will shift the loose material laterally toward the center of the area between the rows so that it may be conveniently gathered up if desired or at least it will have moved out of the way of the earth working cultivator elements.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing:

Figure 1 is a view in side elevation of a spring-tooth cultivator showing the attachment applied thereto.

Fig. 2 is a bottom plan view of the same.

Referring now more particularly to the drawing the numeral 1 designates a cultivator draft beam, to the forward end of which a horse or a draft implement may be attached. The numeral 2 designates the lower portions of the handle bars which are attached to the rear of the draft beam 1 whereby the implement may be controlled by a walking attendant, the upper ends of the handle bars not being shown.

The cultivator most commonly used for working the earth upon the two sides of a row of plants, employs two gangs of spring teeth of the character here shown. Such a cultivator has secured to the draft beam 1 laterally projecting arms which are braced in position by the brace beam 4, and these arms 3 upon each side of the beam 1 have secured thereto the forward ends of the horizontal portions 5 of the downwardly and forwardly curved spring tooth 6. The present implement is shown with a group of three teeth on each side of the draft beam 1, thus leaving a central area between the groups, and beneath the draft beam, through which the row of plants passes. Extending downwardly and rearwardly from the other side of the draft beam is a hanger beam 7 which supports a pair of transverse yokes 8 which in turn carry the spaced parallel dirt shields 9 between which the row of plants passes as the spring teeth work the earth at the two sides of the row.

The present invention consists in adding to the structure above described a relatively wide yoke which comprises a transversely extending portion 10 having the depending end portions or hangers 11 and associating with this yoke a bar 12 which is secured to the under side of the draft beam 1 forwardly of the tooth supporting arms 3 in the manner illustrated. The bar 12 at its rear end merges into the downwardly extending arms 13, each of which at its lower end is provided with a longitudinally extending series of apertures 14. The portions 11 of the transverse yoke are also provided with a series of apertures for the purpose hereinafter pointed out, and as indicated at 15.

Disposed at each side of the longitudinal center of the cultivator structure forwardly of the earth working teeth 6 is a scraper blade which is indicated generally by the numeral 16. Each of these blades comprises a straight forwardly directed portion 17 and a rearwardly and laterally extending wing portion 18. The forwardly and rearwardly extending portions 18 of the blades are in spaced parallel relation as illustrated and each is adjustably secured to the lower end of an arm 13 while each depending portion 11 of the transverse yoke 10 is adjustably secured to a wing 18 adjacent the end of the latter.

In addition to extending laterally and rearwardly each wing 18 has its lower edge bent to extend forwardly slightly, as indicated at 19, and this forwardly extending edge 19 with the bottom edge of each portion 17, contacts the surface of the ground when the cultivator is drawn thereover, and when the teeth 6 are extended slightly into the ground so that all stones and trash will be scraped up and gradually shifted outwardly from the machine out of the path of the points of the teeth. This levels the surface flat and clean and enables the cultivator teeth to thoroughly cultivate the plants in the hill over which the cultivator is moving. With this mechanism it is possible to cultivate rows of plants successfully at least two weeks earlier than it would be possible to do without the attachment. By providing the means for adjusting the scrapers vertically the operator of the machine may use new or old worn teeth.

In addition to clearing the earth ahead of the cultivator teeth, the attachment enables the operator to handle the cultivator easier than is possible to do ordinarily as it provides a steadying support for the structure and therefore is easier for the machine to be used on hillsides or on crooked rows or rocky land than would be the case if the attachment were not applied.

What is claimed, is:

In a cultivator having a draft beam and a group of earth working implements suspended therefrom at each side thereof, an attachment comprising a plate secured to the under side of the beam forwardly of the earth working implements and having a rear downwardly extending substantially V-shaped portion arranged in inverted position whereby are formed two independent arms, a substantially U-shaped yoke arranged in inverted position and extending transversely across and secured to the underside of the beam rearwardly of said arms, said yoke having the side portions disposed adjacent the outer sides of the groups of earth working implements and a pair of earth scraping blades each comprising a relatively wide vertically disposed sheet of metal having a forward portion secured to the lower end of an arm and a longer rear portion arranged obliquely to the forward portion and secured adjacent its outer end to one depending end of said U-shaped yoke, said forward portions being in spaced parallel relation upon opposite sides of the vertical plane in which the beam lies, and the free ends of the obliquely directed portions extending outwardly beyond the sides of the said group of implements, and the lower edge of each oblique portion being turned to form a sharpened forwardly extending blade.

MARVIN J. SHEFFIELD.